No. 836,779. PATENTED NOV. 27, 1906.
W. L. & W. A. PAUL.
AGRICULTURAL IMPLEMENT.
APPLICATION FILED APR. 27, 1905.
6 SHEETS—SHEET 1.
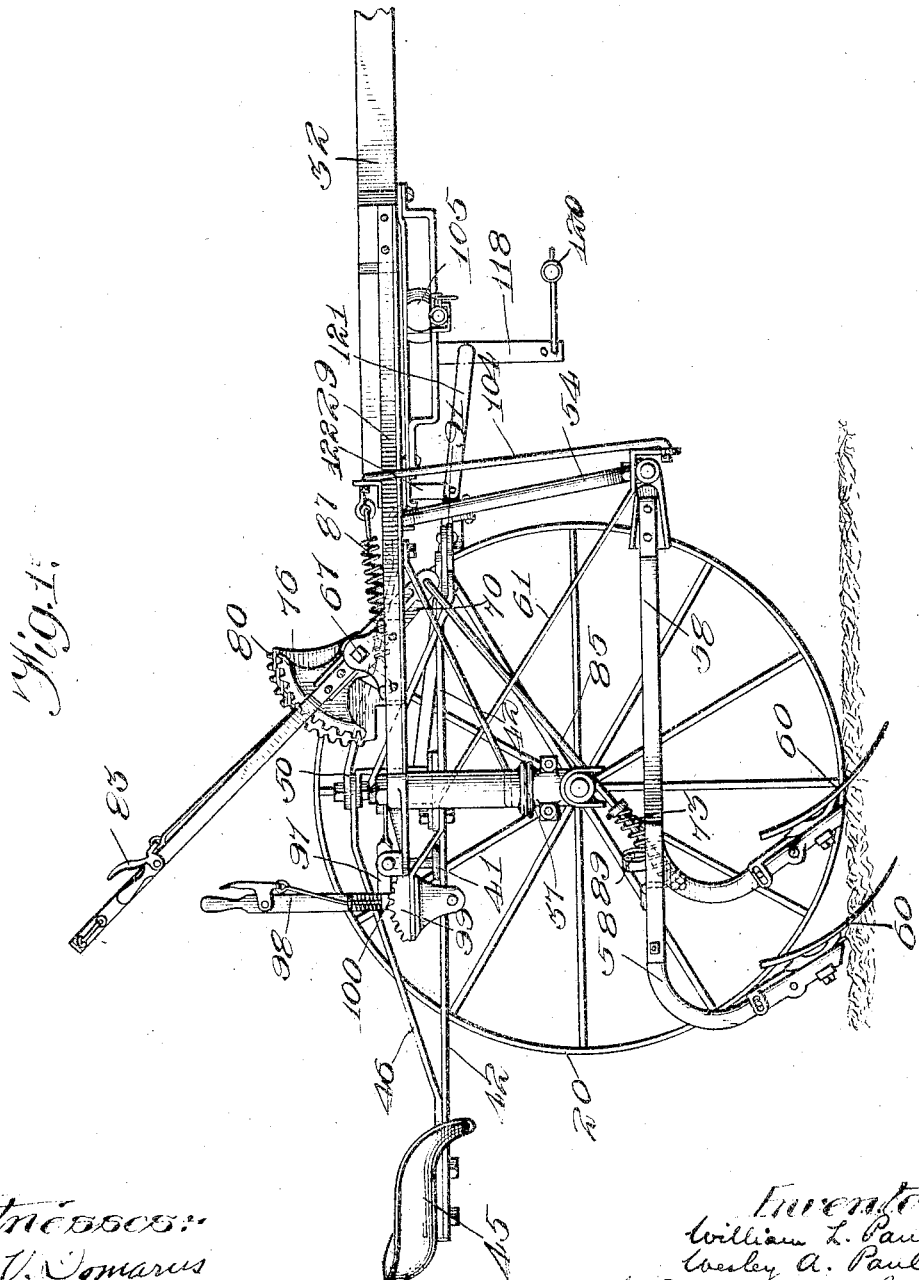
Witnesses:
D. V. Tomarus
Robert F. Allen
Inventors
William L. Paul
Wesley A. Paul
by Bond Adams Pickard & Jackson
their Attys

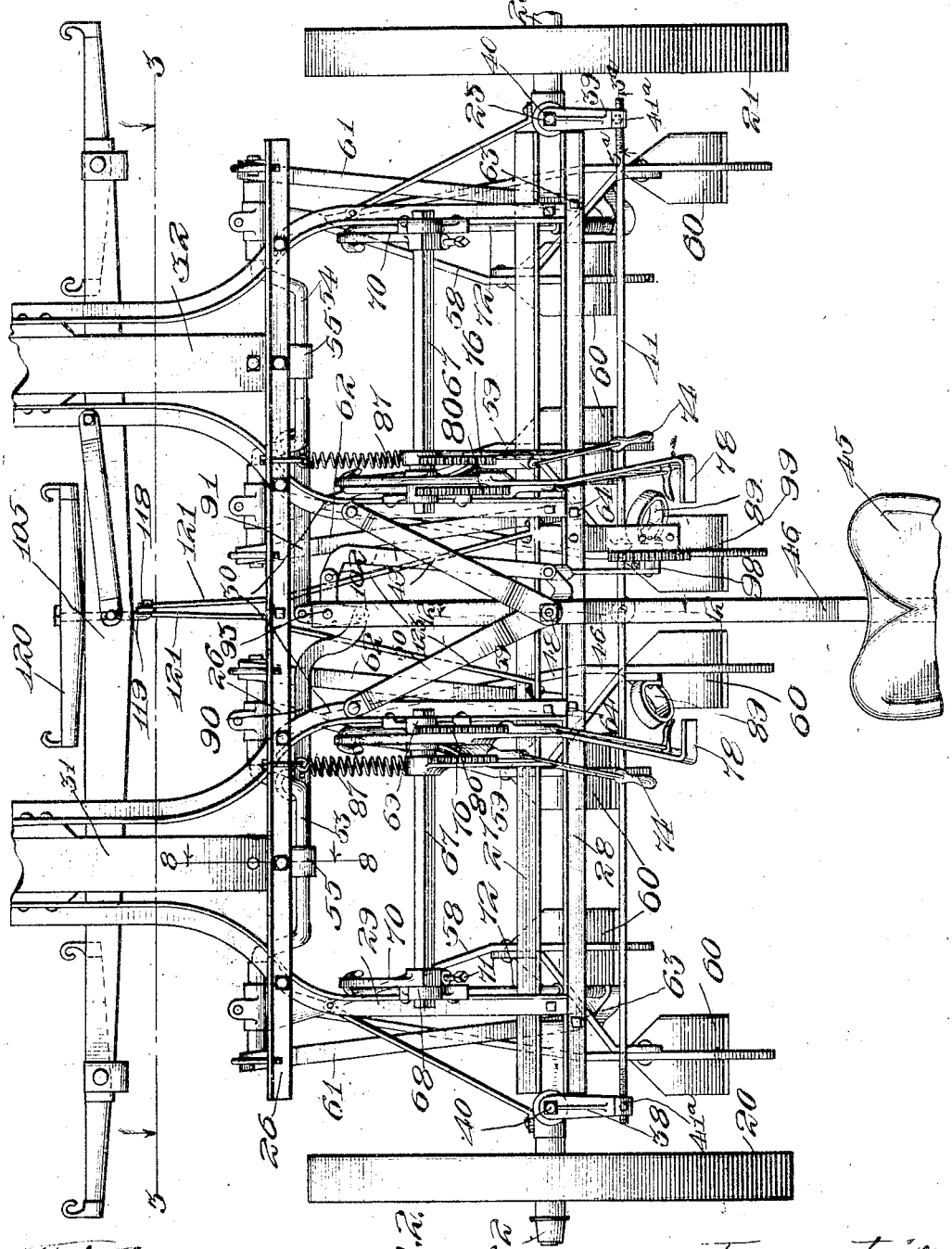

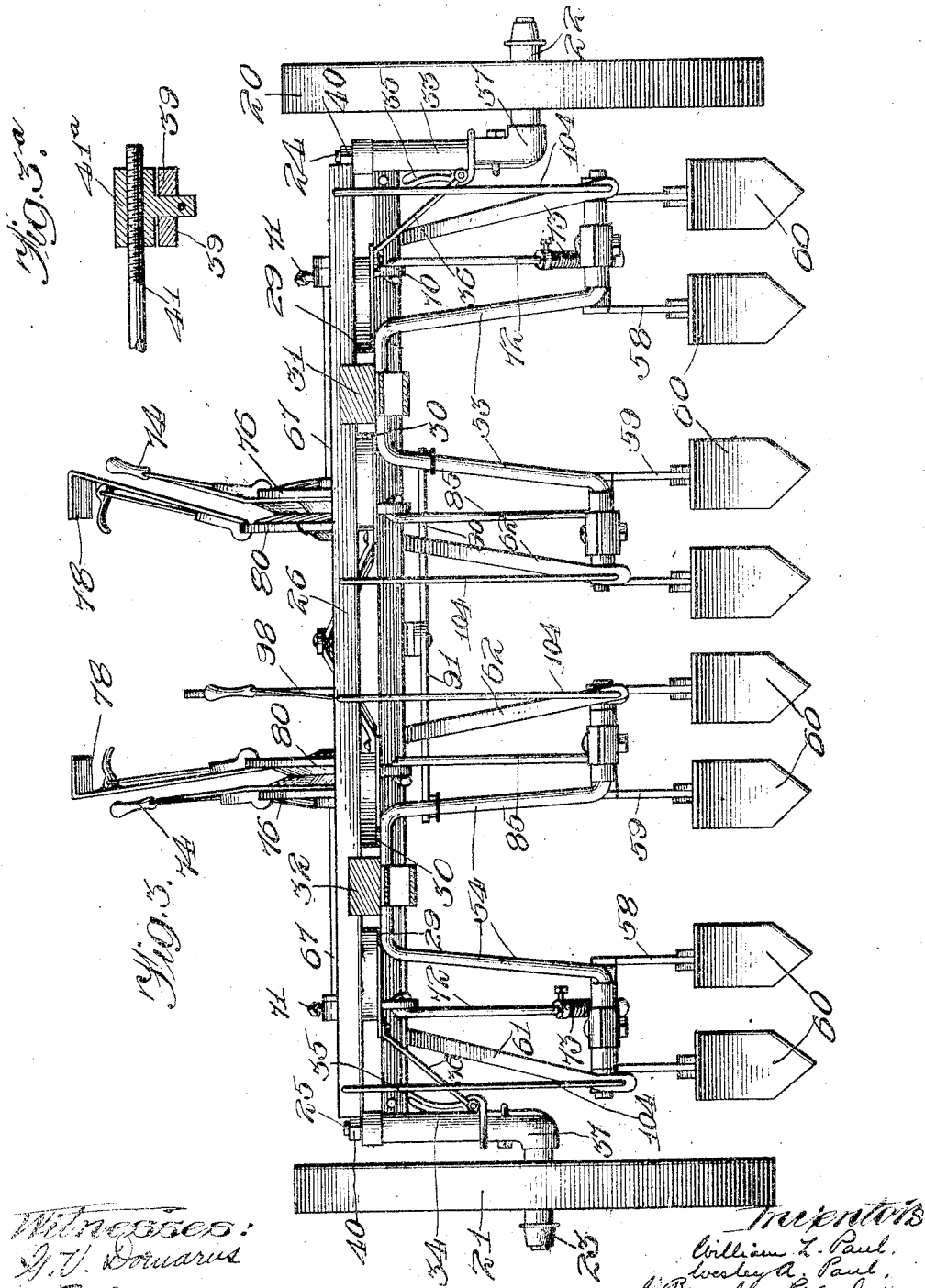

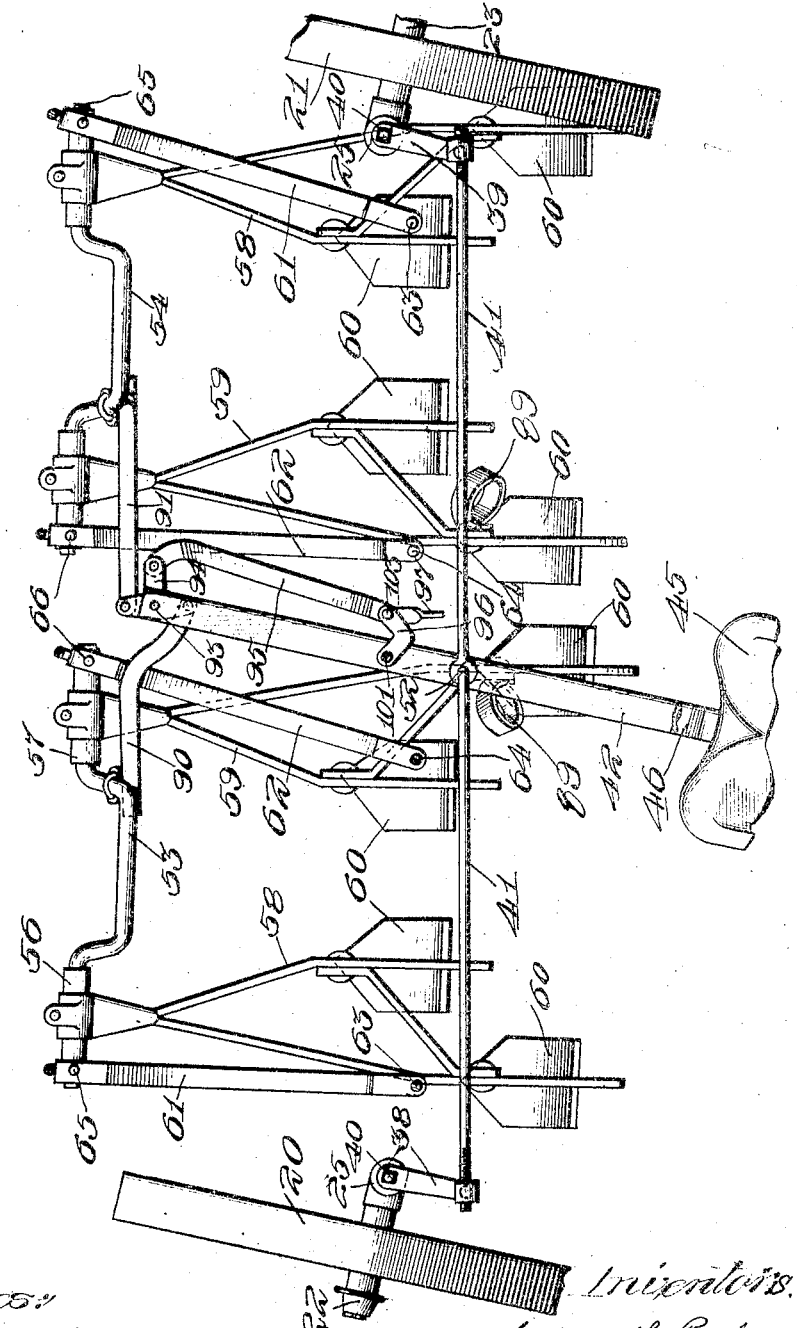

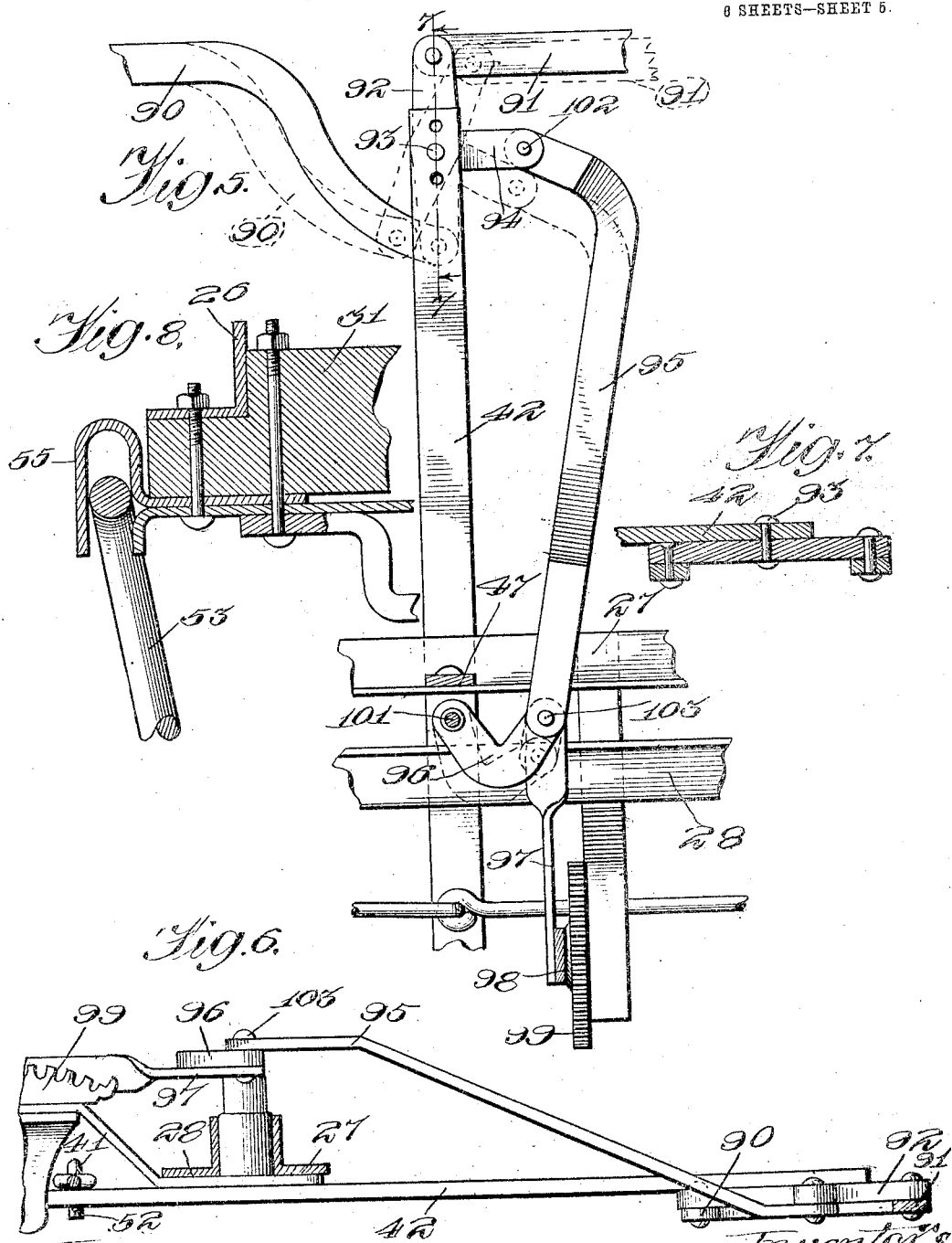

No. 836,779. PATENTED NOV. 27, 1906.
W. L. & W. A. PAUL.
AGRICULTURAL IMPLEMENT.
APPLICATION FILED APR. 27, 1905.
6 SHEETS—SHEET 6.
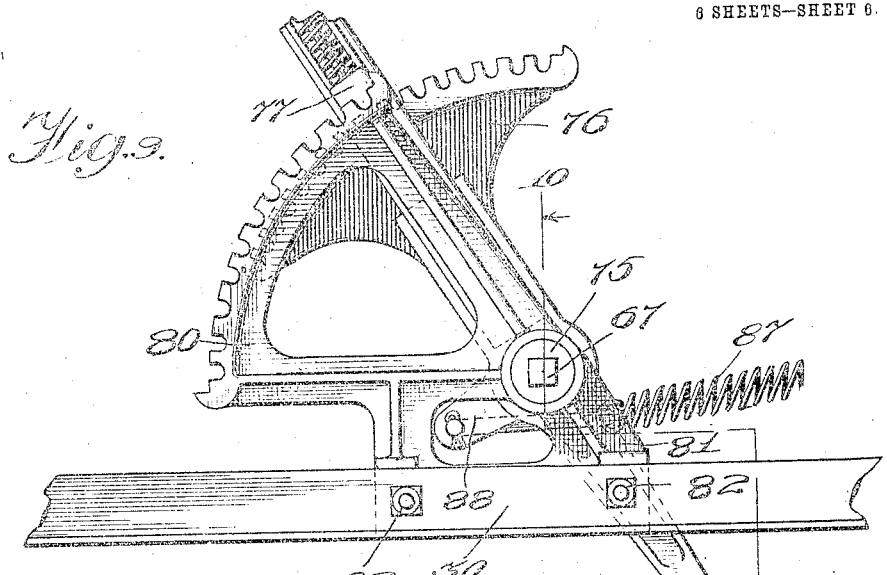
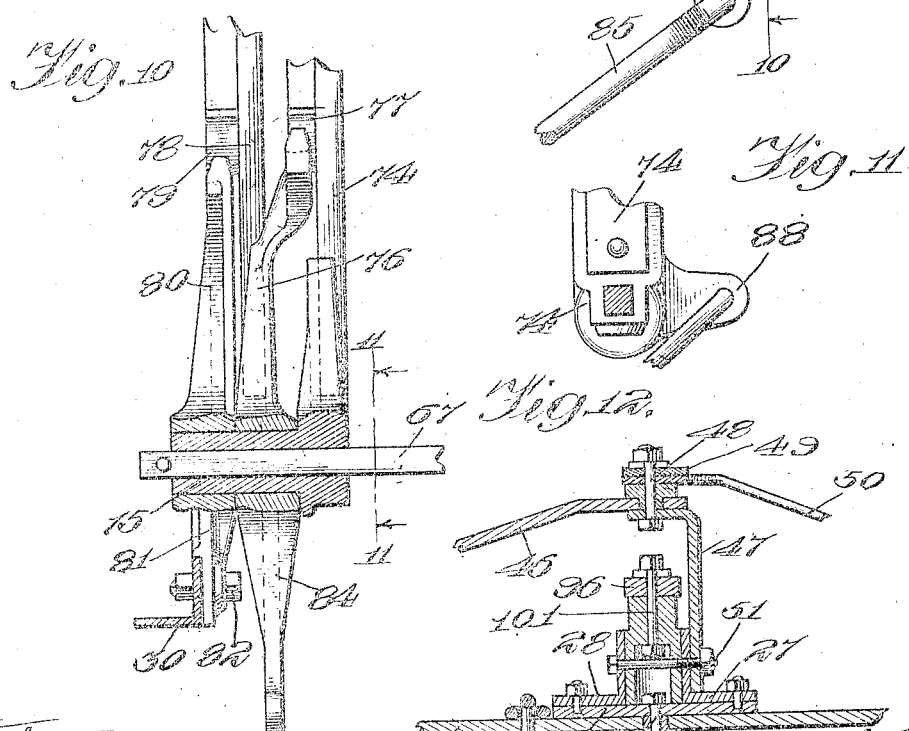
Witnesses:
G. V. Domarus
Robert H. Weir
Inventors
William L. Paul
Wesley A. Paul,
by Bond Adams Pickard & Jackson
Their Attys

UNITED STATES PATENT OFFICE.

WILLIAM L. PAUL AND WESLEY A. PAUL, OF BRADLEY, ILLINOIS, ASSIGNORS TO DAVID BRADLEY MANUFACTURING COMPANY, OF BRADLEY, ILLINOIS, A CORPORATION OF ILLINOIS.

AGRICULTURAL IMPLEMENT.

No. 836,779.

Specification of Letters Patent.

Patented Nov. 27, 1906.

Application filed April 27, 1905. Serial No. 257,726.

*To all whom it may concern:*

Be it known that we, WILLIAM L. PAUL and WESLEY A. PAUL, citizens of the United States, residing at Bradley, in the county of Kankakee and State of Illinois, have invented certain new and useful Improvements in Agricultural Implements, of which the following is a specification, reference being had to the accompanying drawings.

Our invention relates to agricultural implements, and particularly to cultivators, although various features of the invention hereinafter described may be applied to other forms of implements.

It has for its object to provide a number of improvements, the more important of which relate to a construction by which we provide for laterally shifting the gangs by applying power to both ends thereof and at the same time shift or adjust the wheels to change the direction of movement of the machine; also, to the provision of means by which such shifting of the gangs may be effected without changing the distance between them; to the adjustment of the gangs toward and from each other; to the mechanism for raising and lowering the members of the gangs as well as the gangs themselves, and to the draft devices. Our invention also involves other features of the construction illustrated and described, all of which will be hereinafter more particularly pointed out.

In the accompanying drawings, Figure 1 is a side elevation, one wheel being removed. Fig. 2 is a partial plan view. Fig. 3 is a front view, being a section on line 3 3 of Fig. 2. Fig. 3ª is a detail, being a section on line 3ª 3ª of Fig. 2. Fig. 4 is a partial plan view illustrating the mechanism for adjusting pairs of gangs toward and from each other and also the method of guiding the machine. Fig. 5 is an enlarged detail of such adjusting mechanism. Fig. 6 is a side view, partly in section, of the parts shown in Fig. 5. Fig. 7 is a longitudinal section on line 7 7 of Fig. 5. Fig. 8 is an enlarged section on line 8 8 of Fig. 2. Fig. 9 is a detail illustrating the arrangement of the lifting-levers and segments. Fig. 10 is a section on line 10 10 of Fig. 9. Fig. 11 is a partial section on line 11 11 of Fig. 10, and Fig. 12 is an enlarged section on line 12 12 of Fig. 2.

Referring to the drawings, 20 21 indicate carrying-wheels which are mounted upon suitable spindles 22 23, carried by vertically-disposed pivots 24 25, as shown in Figs. 2 and 3. Said pivots are carried at opposite ends of the frame of the machine, which, as best shown in Fig. 2, is composed of transverse angle-irons 26, 27, and 28, the bars 27 and 28 being oppositely disposed and secured adjacent to each other at the rear of the frame. Said bars 26, 27, and 28 are secured together by two pairs of bars 29 30, arranged after the manner of hounds, as shown in Fig. 2. To the forward portion of the pairs of bars 29 30 are secured poles 31 32, the rear ends of said poles being secured to the angle-iron 26.

The pivots 24 25 are held in place at the ends of the bars 27 28 by sleeves 33 34, which are secured to the said bars by brackets 35 and braces 36, as best shown in Fig. 3. Instead of the devices shown any other suitable means may be employed for securing the pivots 24 25 to the frame of the machine.

37 indicates shields for protecting the axle-spindles and also to provide a rest or bearing for the sleeves 33 and 34, so that the weight of the frame of the machine rests on the shields 37. By mounting the wheels upon vertical pivots in the manner described they may be swung to a greater or less angle with the line of draft of the machine to change the direction of travel of the machine. In order to maintain said wheels in parallelism and cause them to move together, arms 38 39 are provided at the upper ends of the pivots 24 25, said arms being preferably arranged to fit over the upper ends of said pivots, so that they may be secured in place by nuts 40, screwed upon the upper ends thereof, as shown in Fig. 3. Said arms extend rearwardly and are connected by a connecting-rod 41, the ends of which are pivotally connected with the arms 38 39 by knuckles 41ª, as shown in Fig. 2. By this means said wheels are compelled to move together. For convenience the connecting-rod 41 is preferably made in two parts connected together, and its ends are screwed into the knuckles 41ª, as shown in Fig. 3ª, but any other suitable means may be employed for connecting the wheels for the purpose stated.

42 indicates the seat-bar, which is placed centrally of the frame and is normally perpendicular to the angle-irons 27 28, composing the rear portion of the frame, as shown in Figs. 2 and 12. The seat-bar 42 is mounted between its ends upon a pivot 43, carried by a plate 44, which is secured to the under sides of the angle-irons 27 28, as best shown in Fig. 12, so that said seat-bar is free to swing in a horizontal plane upon its pivot.

45 indicates the seat carried at the rear end of the seat-bar.

46 indicates a brace which extends from the rear portion of the seat-bar to an upright 47, to which it is pivotally secured by a bolt 48, as shown in Fig. 12.

49 50 indicate braces extending from the bars 30 to the upright 47, being also secured thereto by the bolt 48, as shown in Figs. 2 and 12. The upright 47 is secured to the angle-iron 27, from which it rises, by a bolt 51, as shown in Fig. 12. Said parts 46, 49, and 50 serve to brace the intermediate portion of the frame and the rear portion of the seat-bar.

The connecting-rod 41 is secured to the seat-bar 42 back of the pivot 43, as shown in Fig. 12, by any suitable means, preferably by extending the end of one member of said rod down through a suitable perforation in the seat-bar, as shown at 52 in Figs. 6 and 12. Any other suitable means may, however, be employed to pivotally secure the connecting-rod 41 with the seat-bar in such manner that when the rear portion of the seat-bar is moved to the right or left it carries with it the connecting-rod, and consequently moves the rear portions of the wheels in the same direction. The object of this construction is to cause the wheels to turn, so as to direct the machine to the side opposite that to which the seat moves. For example, when the seat is moved to the right the wheels are turned to cause the machine to run to the left, and vice versa.

53 54 indicate arches at opposite ends of the frame, with which the cultivator-gangs are connected. Said arches are alike and carry similar gangs, so that it will be necessary to describe in detail only the construction and arrangement of a single arch, it being understood that the other is similar to it.

As best shown in Figs. 3 and 8, the central portion of each arch is fitted in a suitable inverted U-shaped guide 55, carried at the rear of the appropriate pole, as 31, so that the arch is adapted to move transversely of the pole. Furthermore, as shown in Fig. 4, each arch is provided at its ends with pipe boxes or sleeves 56 57, to which are connected oppositely-arranged gangs 58 59, having shovels 60 or other suitable cultivating or furrow-opening devices. Said gangs are held rigidly against lateral movement relatively to their respective arches, but may swing vertically, the sleeves 56 57 turning upon the ends of the arches. 61 62 indicate strut-bars or links which at the rear are pivotally connected with the angle-iron 28, as shown at 63 64 in Fig. 2, and at the front are connected with the opposite ends of each arch 53, as shown at 65 66 in Fig. 4. The strut-bars 61 62 of each arch are inclined relatively to each other, their forward ends being farther apart than their rear ends, as shown in Fig. 2. When the arch is moved laterally, therefore, said bars act to adjust the arch angularly with reference to the frame of the machine so as to keep it in substantially constant angular relation to the line of draft, thereby keeping the furrow-openers at right angles with the work.

As will be hereinafter explained, whenever the wheels are turned to alter the line of movement of the machine the arches are shifted laterally in the same direction. It will be seen, therefore, that immediately upon the shifting of the wheels the shovels are adjusted to assume a position at right angles to the new line of draft, thereby maintaining their efficiency, and this is true whether the wheels be shifted in one direction or the other.

The two gangs connected with each arch may be vertically adjusted together or independently by means of mechanism which will now be described.

67 indicates a rock-shaft mounted in suitable bearings 68 69, carried by the bars 29 30, respectively, as shown in Fig. 2.

70 indicates an arm secured near the outer end of the shaft 67, preferably by a set-screw 71 and extending forwardly therefrom. The forward end of said arm is connected by a connecting-rod 72 with the rear portion of the gang 58, as shown in Fig. 2, a presser-spring 73 being provided on the rod 72 to press the shovels down on the ground sufficiently to compensate for the pressure of the driver's feet which are applied to the inner gangs, as hereinafter described.

As shown in Fig. 2, the rock-shaft 67 is squared or otherwise made non-circular in cross-section, and the arm 70 is fitted upon it so that it rocks therewith. Consequently when the shaft 67 is rocked the rear portions of the gang 58 may be raised or lowered. The gang 58 at the opposite end of the machine is similarly connected up, and the corresponding parts are similarly numbered. The shafts 67 are rocked by means of levers 74, each of which, as best shown in Fig. 10, is provided with a sleeve 75, which fits upon the shaft 67 and rocks therewith. The outer surface of said sleeve is circular in cross-section, and mounted upon it is a segmental rack 76, adapted to be engaged by the usual spring-actuated dog 77, mounted on the lever 74, as shown in Figs. 9 and 10. The rack 76 is normally held against rotation upon the sleeve 75 by reason of the fact that it is fixedly secured to a lever 78, arranged adjacent to and parallel with the lever 74. This is accomplished by providing the rack 76 with parallel flanges 78ᵃ 78ᵇ, which overlie the side edges of the lever 78, forming a sort of pocket which receives the end of said lever. The lever is secured by bolts or other suitable means to the rack, and the parts are thereby fixedly secured together. The lever 78 is provided with the usual spring-dog 79, which engages a segmental rack 80 also mounted on the sleeve 75, as shown in Fig. 10. Said rack, however, has a downwardly-extending bracket 81, which is rigidly secured by bolts 82 or other suitable means to the bar 30, as shown in Figs. 9 and 10. The rack 80 being thus held against movement when the lever 78 is locked thereto it holds the segment 76 against movement. It follows that when the dog 77 is in engagement with the rack 76 and the dog 79 is in engagement with the rack 80 the lever 74, is held against movement. By releasing the dog 77 by means of the usual hand-lever 83, as shown in Fig. 1, the shaft 67 may rock independently of the lever 78, thereby raising or lowering the outer gang 58. This arrangement is provided at each side of the machine.

The lever 78 controls the independent raising and lowering of the inner gang 59, said lever being provided with a downward extension connected by a connecting-rod 85 with the said inner gang 59.

It will be observed from the foregoing description that by releasing both dogs 77 and 79 the lever 78 may be rocked independently of the shaft 67, thereby raising or lowering the corresponding inner gang independently. By leaving the dog 77 in locking engagement and releasing the dog 79 the lever 78 may be employed to rock the shaft 67, and thereby effect the raising or lowering of both gangs simultaneously. Furthermore, if desired, the gangs may be set at different heights, so as to accommodate inequalities in the level of the ground.

To assist in the operation of the lever 74 when the gang 58 or both gangs together are raised, a spring 87 is provided, the forward end of which is connected to the angle-iron 26 or other suitable fixed support, while its rear end is connected with a lug 88, projecting rearwardly from the lever 74, as shown in Figs. 9 and 11.

As best shown in Fig. 2, the two pairs of levers 74 and 78 are placed at opposite sides of and adjacent to the seat-bar 42, so that they are conveniently accessible to the driver. As also therein shown, the inner gangs 59 are provided with foot-rests in the form of loops 89 to receive the rider's feet and provide for the operation of the shifting mechanism, as hereinafter described.

As shown in Figs. 2 and 4, the arches 53 and 54 are held a proper distance apart by straps 90 91, connected at their outer ends to the said arches, respectively, and at their inner ends with a cross-head 92, mounted on a pivot 93, secured in the forward end of the seat-bar 42. Where it is not desired to provide for adjusting the arches toward and from each other, the straps 90 91 may be pivotally connected together; but as it is frequently desirable to make such adjustment we provide therefor means by which this may be conveniently accomplished without interfering with the holding of the arches properly apart or with their adjustment laterally whenever the direction of the movement of the machine is altered. When the cross-head 92 is in line with the seat-bar 42, the arches are held in their intermediate position, so far as their distance apart is concerned, but by swinging the cross-head in one direction or the other they may be drawn close together or thrown farther apart, as the case may be. In order to effect such movement of the cross-head, we provide said cross-head with a laterally-projecting arm 94, which is connected by a link 95 with a swinging arm 96, the latter being connected by a connecting-rod 97 with an operating-lever 98, as best shown in Fig. 5. By operating said lever 98 the connecting-bar 95 may be thrown forward or drawn backward, thereby rocking the cross-head 92 accordingly. A segmental rack 99 and spring-actuated dog 100 are provided for locking the lever 98 in its different positions of adjustment. By the construction described the arches may be drawn together or separated at pleasure, and the relative position of the arches is not interfered with by the lateral swinging of the seat-bar to change the direction of travel of the machine, since the arches are held a set distance apart by the cross-head 92 regardless of the position of the seat-bar 42. This is due to the fact that the pivot 101, upon which the arm 96 is mounted, is coincident with the pivot 43 of the seat-bar 42, as shown in Fig. 12, and said pivot 101, together with the pivot 93, the pivot 102, which unites the bar 95 with the arm 94, and the pivot 103, connecting the arm 96 and bar 95, together form a parallelogram regardless of the position of the seat-bar, and the pivot 103 being normally held against movement relatively to the frame of the machine by means of the locking devices of the lever 98 it follows that the arm 94 is always maintained in the same angular relation to the frame, consequently similarly holding the cross-head 92. The position of the cross-head and of the parallelogram may of course be adjusted at any time independently of movement of the seat-bar by operating the lever 98; but this is done only when it is desired to move the gangs toward or from each other.

104 indicates a series of pendent rods connected at their upper ends to the front angle-iron 26 and at their lower ends with the forward ends of the strut-bars or links 61 62, as shown in Fig. 3. Said rods serve to support the front ends of the gangs and also brace the parts 61 62.

The operation of the implement is as follows: With the parts in the position shown in Fig. 2 the machine is intended to move directly forwardly, the seat-bar 42 being then perpendicular to the frame. When the operator wishes to turn the machine to the right, for example, he presses to the right with his feet on the inner gang 59, thereby swinging the seat-bar so as to throw the seat to the left and the arches to the right. At the same time the wheels are correspondingly turned through the connection of the seat-bar with the connecting-rod 41. This operation also laterally swings the arches relatively to the frame, so as to carry the shovels into the new line of movement, this being effected by means of the parts 61 62. By thus adjusting the shovels simultaneously with the wheels the gangs are always parallel with the draft and the shovels are therefore kept at right angles with the work, so that they are maintained at their full efficiency, always cutting the full width and leaving no unplowed ground, and, besides, they may be shifted laterally very quickly to avoid stumps or other obstructions. The lateral adjustment of the gangs does not, however, alter the distance between them, for reasons heretofore given; but they may be so adjusted instantly by operating the lever 98. The links 61 62 are important in connection with both the simultaneous lateral shifting of the arches and their separate movement laterally, since such parts serve to support the forward portions of the gangs and cause them to move smoothly. The placing of the driver's seat on the lever or seat-bar, by which the lateral shifting of the gangs and the turning of the wheels is effected, is also of great importance, since it permits the driver to use his strength to the greatest advantage. It will be noted that by means of the lever or seat-bar power is applied to the forward ends of the gangs, while the rear ends of the inner gangs receive the direct thrust of the driver's feet, so that power is applied at the rear as well as at the front ends of the gangs, and consequently they may be moved laterally very quickly, making it easy for the operator to dodge obstacles. Moreover, as the shifting is accomplished by the use of his feet and legs his hands are left free to guide the team or to operate the different levers, as may be desired.

If it be desired to raise or lower both gangs of either pair at the same time, it may be accomplished by means of the lever 78 without unlocking the lever 74, or the inner gangs only may be raised or lowered by means of the lever 78, the lever 74 being unlocked. Also the outer gangs may be raised or lowered independently by means of the levers 74.

We have now described with great particularity the specific embodiment of our invention illustrated in the accompanying drawings; but we wish it to be understood that in doing so it has not been our intention to restrict ourselves to the specific construction illustrated and described, except in so far as such features are particularly claimed. So far as the broader claims are concerned they are to be construed generically.

That which we claim as our invention, and desire to secure by Letters Patent, is—

1. An agricultural implement having a frame, wheels movable angularly relatively to the frame to change the line of travel of the machine, a laterally-movable seat-support, and intermediate mechanism actuated by lateral movement of said seat-support for simultaneously moving the wheels and seat-support in the same direction.

2. An agricultural implement having a frame, wheels movable angularly relatively to the frame to change the line of travel of the machine, a laterally-movable seat-support, a seat carried thereby, and intermediate mechanism actuated by lateral movement of said seat-support and acting to angularly adjust the wheels and simultaneously move the seat in the same direction as the adjacent portions of the wheels, whereby the position of the seat with relation to the line of travel of the machine is maintained.

3. An agricultural implement having a frame, wheels movable angularly relatively to the frame to change the line of travel of the machine, a seat-support pivotally mounted to swing laterally, and intermediate mechanism actuated by lateral movement of said seat-support for simultaneously moving the wheels and seat-support in the same direction.

4. An agricultural implement, having a frame, wheels having vertical pivots whereby the wheels may be adjusted angularly relatively to the frame, a laterally-movable seat-support, and means for automatically adjusting said wheels when said seat-support is moved laterally.

5. An agricultural implement, having a frame, wheels movable angularly relatively to the frame, a pivotally-mounted seat-support adapted to swing laterally, and means for automatically adjusting said wheels angularly simultaneously with and similarly to the lateral movement of the seat-support.

6. An agricultural implement having a frame, wheels movable angularly relatively to the frame, a seat-support pivotally mounted to swing laterally, and means connected with said wheels and with the seat-support back of its pivot for causing said wheels to turn with the seat-support.

7. An agricultural implement having a frame, wheels movable angularly relatively to the frame to change the line of travel of the machine, a laterally-movable seat-support, one or more furrow-openers, intermediate mechanism actuated by lateral movement of said seat-support for adjusting said wheels, and means actuated by lateral movement of the seat-support for correspondingly adjusting said furrow-openers.

8. An agricultural implement having a frame, wheels movable angularly relatively to the frame to change the line of travel of the machine, a laterally-movable seat-support, one or more laterally-rigid furrow-opener gangs, intermediate mechanism actuated by lateral movement of said seat-support to adjust said wheels angularly, means actuated by said seat-support for moving said gangs laterally to correspond with the adjustment of the wheels, and foot-rests carried by said gangs.

9. An agricultural implement, having a frame, wheels movable angularly relatively to the frame, a laterally-movable seat-support, means for automatically adjusting said wheels when said seat-support is moved laterally, furrow-openers, and means connecting said furrow-openers with the forward portion of said seat-support.

10. An agricultural implement, having a frame, wheels movable angularly relatively to the frame, a seat-support pivoted intermediately to swing laterally, means connecting said wheels with said seat-support back of the pivot thereof, furrow-openers, and means connecting said furrow-openers with said seat-support forward of the pivot thereof.

11. An agricultural implement having a frame, wheels movable angularly relatively to the frame to change the line of travel of the machine, a laterally-movable seat-support, intermediate mechanism actuated by lateral movement of said seat-support for simultaneously moving the wheels and seat-support in the same direction, one or more laterally-rigid cultivator-gangs, means actuated by lateral movement of said seat-support for moving said gangs laterally to correspond with the adjustment of the wheels and foot-rests carried by said gangs.

12. An agricultural implement, having a frame, wheels movable angularly relatively to the frame, a seat-support pivoted intermediately to swing laterally, means connecting said wheels with the seat-support back of the pivot thereof, a plurality of furrow-opener gangs at each side of said seat-support, and means connecting said furrow-opener gangs with said support forward of the pivot thereof.

13. An agricultural implement, having a frame, wheels movable angularly relatively to the frame, a seat-support pivotally mounted intermediately to move laterally, means connecting said wheels with the seat-support back of the pivot thereof, arches at opposite sides of said seat-support, means connecting said seat-support with said arches in advance of the pivot thereof, and cultivating devices connected with said arches.

14. An agricultural implement, having a frame, wheels movable angularly relatively to the frame, a seat-support pivotally mounted intermediately to move laterally, means connecting said wheels with the seat-support back of the pivot thereof, arches at opposite sides of said seat-support, means connecting said seat-support with said arches in advance of the pivot thereof, cultivating devices connected with said arches, and means for adjusting said arches toward and from each other.

15. An agricultural implement, having a frame, wheels movable angularly relatively to the frame, a seat-support pivotally mounted intermediately to move laterally, means connecting said wheels with said seat-support back of the pivot thereof, arches at opposite sides of said seat-support, means connecting said seat-support with said arches in advance of the pivot thereof, cultivating devices connected with said arches, and means for vertically adjusting said cultivating devices.

16. An agricultural implement, having a frame, wheels movable angularly relatively to the frame, furrow-opening devices, and means for simultaneously adjusting said wheels angularly and correspondingly adjusting said furrow-opening devices to maintain substantially constant their angular relation to the line of draft.

17. An agricultural implement, having a frame, wheels movable angularly relatively to the frame, a laterally-movable lever, means connecting said wheels with said lever whereby said wheels may be adjusted by the operation of said lever, furrow-openers, means connecting said furrow-openers with said lever, and means for laterally adjusting said furrow-openers when said lever is operated to maintain substantially constant their angular relation to the line of draft.

18. An agricultural implement having a frame, wheels movable angularly relatively to the frame, a lever pivotally mounted to move laterally, means connecting said wheels with said lever so that said wheels are angularly adjusted when said lever is operated, furrow-openers connected with said lever forward of the pivot thereof and means for holding said furrow-openers in substantially constant angular relation to the line of draft when said lever is operated.

19. An agricultural implement, having a frame, wheels movable angularly relatively to the frame, a lever pivotally mounted intermediately to swing laterally, means connecting said wheels with said lever at one side of the pivot thereof, furrow-openers connected with said lever at one side of the pivot thereof, means actuated by the operation of said lever for moving said furrow-openers in conformity with the adjustment of the wheels and means for holding said furrow-openers in substantially constant angular relation to the line of draft.

20. An agricultural implement, having a frame, wheels movable angularly relatively to the frame, a lever pivotally mounted intermediately to swing laterally, means connecting said wheels with said lever at one side of the pivot thereof, arches connected with the said lever at the opposite side of the pivot thereof, furrow-openers connected with said arches, and means actuated by the operation of said lever for shifting said arches.

21. An agricultural implement, having a frame, wheels movable angularly relatively to the frame, a lever pivotally mounted intermediately to swing laterally, means connecting said wheels with said lever at one side of the pivot thereof, arches connected with said lever at the opposite side of the pivot thereof, links connected with the end portions of said arches and with said frame, and cultivating devices connected with the end portions of said arches.

22. An agricultural implement, having a frame, wheels movable angularly relatively to the frame, a seat-support pivotally mounted intermediately to swing laterally, means connecting said wheels with said seat-support at the rear of the pivot thereof, cultivator-arches connected with said seat-support forward of the pivot thereof, and laterally-rigid cultivating-gangs connected with said arches.

23. An agricultural implement, having a frame, wheels movable angularly relatively to the frame, a seat-support pivotally mounted intermediately to swing laterally, means connecting said wheels with said seat-support at the rear of the pivot thereof, cultivator-arches connected with said seat-support forward of the pivot thereof, links connected with the end portions of said arches and with said frame, and laterally-rigid cultivating-gangs connected with said arches.

24. An agricultural implement, having a frame, wheels movable angularly relatively to the frame, a seat-support pivotally mounted intermediately to swing laterally, means connecting said wheels with said seat-support at the rear of the pivot thereof, cultivator-arches connected with said seat-support forward of the pivot thereof, laterally-rigid cultivating-gangs connected with said arches, and means for raising and lowering the cultivating-gangs.

25. An agricultural implement, having a frame, wheels movable angularly relatively to the frame, a seat-support pivotally mounted intermediately to swing laterally, means connecting said wheels with said seat-support at the rear of the pivot thereof, cultivator-arches connected with said seat-support forward of the pivot thereof, links connected with the end portions of said arches and with said frame, laterally-rigid cultivating-gangs connected with said arches, and means for raising and lowering the cultivating-gangs.

26. An agricultural implement, having a frame, wheels movable angularly relatively to the frame, a seat-support pivotally mounted intermediately to swing laterally, means connecting said wheels with said seat-support at the rear of the pivot thereof, cultivator-arches connected with said seat-support forward of the pivot thereof, laterally-rigid cultivating-gangs connected with said arches, and means for adjusting said arches toward and from each other.

27. An agricultural implement, having a frame, wheels movable angularly relatively to the frame, a seat-support pivotally mounted intermediately to swing laterally, means connecting said wheels with said seat-support at the rear of the pivot thereof, cultivator-arches connected with said seat-support forward of the pivot thereof, links connected with the end portions of said arches and with said frame, laterally-rigid cultivating-gangs connected with said arches, and means for adjusting said arches toward and from each other.

28. An agricultural implement, having a frame, wheels movable angularly relatively to the frame, a seat-support pivotally mounted intermediately to swing laterally, means connecting said wheels with said seat-support at the rear of the pivot thereof, cultivator-arches connected with said seat-support forward of the pivot thereof, laterally-rigid cultivating-gangs connected with said arches, and pendent supports for said arches.

29. An agricultural implement, having a frame, wheels movable angularly relatively to the frame, a seat-support pivotally mounted intermediately to swing laterally, means connecting said wheels with said seat-support at the rear of the pivot thereof, cultivator-arches connected with said seat-support forward of the pivot thereof, links connected with the end portions of said arches and with said frame, laterally-rigid cultivating-gangs connected with said arches, and pendent supports for said arches.

30. An agricultural implement, having a frame, wheels movable angularly relatively to the frame, a seat-support pivotally mounted intermediately to swing laterally, means connecting said wheels with said seat-support at the rear of the pivot thereof, cultivator-arches connected with said seat-support forward of the pivot thereof, laterally-rigid cultivating-gangs connected with said arches, means for adjusting said arches toward and from each other, and pendent supports for said arches.

31. In an agricultural implement, the combination of a frame, wheels movable angularly relatively to the frame, cultivating devices, and means for simultaneously angularly adjusting said wheels and adjusting said cultivating devices to maintain substantially constant their angular relation to the line of draft.

32. An agricultural implement having a frame, wheels movable angularly relatively to the frame, a seat-support pivotally mounted to swing laterally, means connecting said wheels with said seat-support, cultivator-arches connected with said seat-support, and laterally-rigid cultivator-gangs connected with said arches.

33. An agricultural implement, having a frame, wheels movable angularly relatively to the frame, cultivator-arches connected with said frame, cultivating devices connected to said arches, a lever, means operated by a single movement of said lever for adjusting said wheels and simultaneously shifting said arches laterally and means for maintaining substantially constant the angular relation of said arches to the line of draft when they are shifted laterally.

34. An agricultural implement having a frame, wheels movable angularly relatively to the frame, a plurality of cultivator-arches, strut-bars connecting the end portions of said arches with the frame, cultivator-gangs connected with said arches and held fixedly against lateral movement independently thereof, means for simultaneously adjusting said wheels angularly, and means for automatically maintaining substantially constant the angular relation of said arches and said gangs relatively to the line of draft.

35. An agricultural implement, having a frame, wheels movable angularly relatively to the frame, a lever pivotally connected between its ends with said frame, means connecting said wheels with said lever at one side of the pivot thereof, cultivator-arches connected with said lever at the opposite side of the pivot thereof, cultivating devices connected with said arches, and bars connecting said arches with the frame.

36. In an agricultural implement, the combination of a frame, a plurality of cultivating devices, a seat-support pivoted intermediately to swing laterally, cultivator-arches connected with said seat-support, a plurality of cultivator-gangs connected with each of said arches, and levers for lifting said gangs either separately or together independently of the position of said gangs relatively to the frame.

37. An agricultural implement having a frame, wheels movable angularly relatively to the frame, a seat-support pivoted intermediately to swing laterally, means actuated by said seat-support for moving said wheels angularly, furrow-openers, and means actuated by movement of said seat-support for moving said furrow-openers correspondingly with the wheels.

38. An agricultural implement having a frame, a lever pivotally mounted intermediately to swing laterally, furrow-openers connected with said lever and arranged to be moved laterally by the operation thereof, and a second lever adapted to be operated independently of movement of said first-mentioned lever for adjusting said furrow-openers toward and from each other.

39. An agricultural implement having a frame, a lever pivotally mounted intermediately to swing laterally, furrow-openers connected with said lever and arranged to be moved laterally by the operation thereof, and a second lever connected with said first-mentioned lever and adapted to be operated independently thereof for adjusting said furrow-openers toward and from each other.

40. An agricultural implement, having a frame, a lever pivotally mounted intermediately to swing laterally, furrow-openers, a cross-head pivotally carried by said lever, and means connecting said furrow-openers with the end portions of said cross-head.

41. An agricultural implement, having a frame, a lever pivotally mounted intermediately to swing laterally, furrow-openers, a cross-head carried by said lever, means connecting said furrow-openers with the end portions of said cross-head, and means independent of movement of said lever for swinging said cross-head to vary the distance between said furrow-openers.

42. An agricultural implement, having a frame, a lever pivotally mounted intermediately to swing laterally, furrow-openers connected with said lever at one side of the pivot thereof, and means for maintaining constant the distance between said furrow-openers when said lever is swung laterally.

43. An agricultural implement, having a frame, a lever pivotally mounted intermediately to swing laterally, arches connected with said lever at one side of the pivot thereof, furrow-openers connected with said arches, and means for maintaining constant the distance between said arches when said lever is swung laterally.

44. An agricultural implement, having a frame, a lever pivotally mounted intermediately to swing laterally, furrow-openers connected with said lever at one side of the pivot thereof, means for maintaining constant the distance between said furrow-openers when said lever is swung laterally, and means for adjusting said furrow-openers toward and from each other.

45. An agricultural implement, having a frame, a lever pivotally mounted intermediately to swing laterally, arches connected with said lever at one side of the pivot thereof, furrow-openers connected with said arches, means for maintaining constant the distance between said arches when said lever is swung laterally, and means for adjusting said arches toward and from each other.

46. An agricultural implement, having a frame, a lever pivotally mounted intermediately to swing laterally, a cross-head carried by said lever, furrow-openers connected with the end portions of said cross-head, a laterally-projecting arm carried by said cross-head, a swinging arm, a link connecting said arms, and means for holding said swinging arm in different positions of adjustment.

47. An agricultural implement, having a frame, a lever pivotally mounted intermediately to swing laterally, a cross-head carried by said lever, furrow-openers connected with the end portions of said cross-head, a laterally-projecting arm carried by said cross-head, a swinging arm carried by said lever, a link connecting said arms, and lever mechanism for adjusting the position of said cross-head.

48. In a cultivator, the combination of a wheeled frame, a plurality of arches connected therewith and arranged end to end, cultivator-gangs connected with said arches, a seat-bar, and means connected with said seat-bar for adjusting said arches toward and from each other.

49. In a cultivator, the combination of a wheeled frame, a plurality of arches connected therewith and arranged end to end, cultivator-gangs connected with said arches, and means for moving said arches laterally in the same direction and simultaneously swinging them relatively to the frame.

50. In a cultivator, the combination of a wheeled frame, a plurality of arches connected therewith and arranged end to end, cultivator-gangs connected with said arches, means for moving said arches laterally in the same direction and simultaneously swinging them relatively to the frame, and means for adjusting said arches toward and from each other.

51. In a cultivator, the combination of a wheeled frame, a plurality of arches carried thereby and arranged end to end, cultivator-gangs connected with said arches, means for simultaneously adjusting said arches laterally in the same direction, and means for holding said arches in parallelism with the line of draft when they are so moved laterally.

52. In a cultivator, the combination of a wheeled frame, a plurality of arches carried thereby and arranged end to end, cultivator-gangs connected with said arches, means for simultaneously adjusting said arches laterally in the same direction, means for adjusting said arches toward and from each other, and means for holding said arches in parallelism with the line of draft when they are moved laterally.

53. In a cultivator, the combination of a frame, a pair of cultivator-gangs at each end thereof, the gangs of each pair being independently adjustable vertically, and springs for pressing down upon the outer gangs of each pair.

54. An agricultural implement, having a frame, arches connected with said frame, furrow-openers connected with said arches, means for shifting said arches laterally, and means for maintaining substantially constant the distance between said arches when they are so shifted laterally.

55. An agricultural implement, having a frame, a laterally-swinging lever, a plurality of arches arranged parallel with the frame and movable transversely thereof, bars connected with said lever and with one another to form substantially a parallelogram, and means connecting said arches with said parallelogram.

56. An agricultural implement, having a frame, a laterally-swinging lever, a plurality of arches arranged parallel with the frame and movable transversely thereof, bars connected with said lever and with one another to form substantially a parallelogram, means connecting said arches with said parallelogram, and means for adjusting the position of said parallelogram.

57. An agricultural implement, having a frame, a laterally-swinging lever, a plurality of arches arranged parallel with the frame and movable transversely thereof, bars connected with said lever and with one another to form substantially a parallelogram, means connecting said arches with said parallelogram, and means independent of the movement of said lever for adjusting the position of said parallelogram.

58. An agricultural implement having a frame, wheels movable angularly relatively to the frame, a seat-support pivoted intermediately to swing laterally, means connecting said wheels with said seat-support, furrow-openers, and means connecting said furrow-openers with said seat-support forward of the pivot thereof.

59. An agricultural implement having a frame, wheels movable angularly relatively to the frame, a seat-support pivoted intermediately to swing laterally, means connecting said wheels with the seat-support, a plurality of furrow-opener gangs at each side of said seat-support, and means connecting said furrow-opener gangs with said seat-support forward of the pivot thereof.

60. An agricultural implement having a frame, wheels movable angularly relatively to the frame, a seat-support pivotally mounted intermediately to move laterally, means connecting said wheels with the seat-support, arches at opposite sides of said seat-support, means connecting said seat-support with said arches in advance of the pivot thereof, cultivating devices connected with said arches, and means for adjusting said arches toward and from each other.

61. An agricultural implement having a frame, wheels movable angularly relatively to the frame, a lever pivotally mounted to swing laterally, means actuated by said lever for moving said wheels angularly, arches, furrow-openers connected with said arches, and means actuated by the operation of said lever for shifting said arches to maintain substantially constant their angular relation to the line of draft.

62. An agricultural implement having a frame, a lever pivotally mounted to swing laterally, furrow-openers connected with said lever and movable laterally by the operation thereof, and operating mechanism carried by said lever for maintaining substantially constant the distance between said furrow-openers when said lever is actuated.

63. An agricultural implement having a frame, furrow-openers, a lever for moving said furrow-openers laterally in the same direction, and operating mechanism for maintaining substantially constant the angular relation of said furrow-openers with the line of draft when said furrow-openers are moved laterally.

64. An agricultural implement having a frame, wheels movable angularly relatively thereto, a pivotally-mounted seat-support adapted to swing laterally, furrow-opener gangs, and means actuated by said seat-support for angularly adjusting said wheels and simultaneously shifting said gangs to correspond with the angular adjustment of the wheels.

65. An agricultural implement having a frame, wheels movable angularly relatively to the frame, a laterally-swinging lever, means actuated by said lever for angularly adjusting the wheels, one or more cultivator-arches, laterally-rigid cultivator-gangs connected with said arches, and means actuated by said lever for moving said arches laterally.

WILLIAM L. PAUL.
WESLEY A. PAUL.

Witnesses:
D. B. MORGAN,
WM. R. BOND.